United States Patent [19]

Rutan

[11] Patent Number: 4,641,800

[45] Date of Patent: Feb. 10, 1987

[54] TANDEM OR MULTI-WINGED HIGH PERFORMANCE AIRCRAFT

[76] Inventor: Elbert L. Rutan, Hangar 73, Mojave Airport, Mojave, Calif. 93501

[21] Appl. No.: 524,332

[22] Filed: Aug. 18, 1983

[51] Int. Cl.[4] .......................... B64C 3/54; B64C 3/40
[52] U.S. Cl. ................................. 244/218; 244/45 A; 244/45 R; 244/46
[58] Field of Search ...................... 244/45 A, 46, 45 R, 244/201, 218, 203, 49

[56] References Cited

U.S. PATENT DOCUMENTS

| | | | |
|---|---|---|---|
| 2,744,698 | 5/1956 | Baynes | 244/218 |
| 3,330,501 | 7/1967 | Barber | 244/46 |
| 3,738,595 | 6/1973 | Bouchnik | 244/218 |
| 3,776,491 | 12/1973 | Oulton | 244/218 |
| 4,093,156 | 6/1978 | Coe, Jr. | 244/45 A |

FOREIGN PATENT DOCUMENTS

| | | | |
|---|---|---|---|
| 413781 | 8/1910 | France | 244/218 |
| 493655 | 10/1938 | United Kingdom | 244/218 |
| 814450 | 6/1959 | United Kingdom | 244/45 A |

OTHER PUBLICATIONS

*Flight International*, "Canards: Design With Care", pp. 19-21, Feb. 23, 1985.
"Notes on the Tail–First Aeroplane", RAE Report BA 1542, S. B. Gates, Nov. 18, 1941.
"Aircraft Design Part I, Parametric Studies", A. A. Lebedinski, Dept. of Aeronautical Eng., Indian Institute of Science, Bangalore, India, 1963.
NACA RM-L8614, "Study of the Canard Config. with Particular Ref. to Transonic Flight Characteristics and Low Speed Characteristics at High Lift", C. W. Mathews, Nov. 16, 1949.
NACA TN-1499, "Flight Tests of the Miles Libellula Tandem Biplane", P. Brotherhood, et al., Aug. 1944.

*Primary Examiner*—Galen L. Barefoot
*Assistant Examiner*—Rodney Corl
*Attorney, Agent, or Firm*—Edwin L. Spangler, Jr.

[57] ABSTRACT

This invention relates to a tandem or multi-winged aircraft wherein a primary wing system is so designed and equipped that it is capable of being actuated in a manner to bring about a shift in the neutral point of the craft relative to its center of gravity and wherein a secondary wing system located ahead of the primary one and movable fore and aft relative to the latter is deployed and angled during its excursion so as to effectively counteract the neutral point shift that would be brought about by deploying the primary wing system alone thereby maintaining the neutral point at approximately its former location in at least both the cruise mode as well as the high-lift mode preferred for landing and take-off.

23 Claims, 7 Drawing Figures

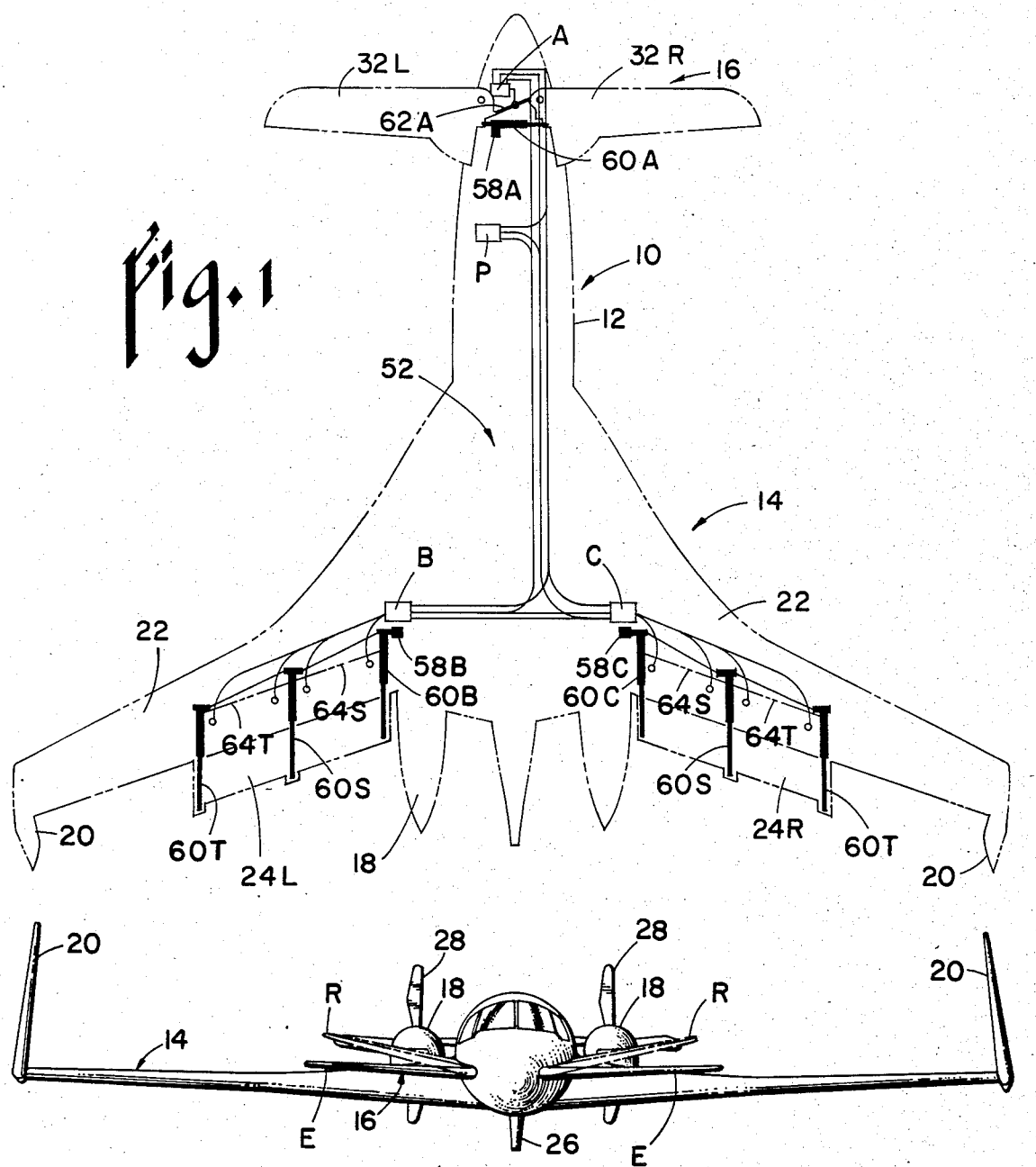

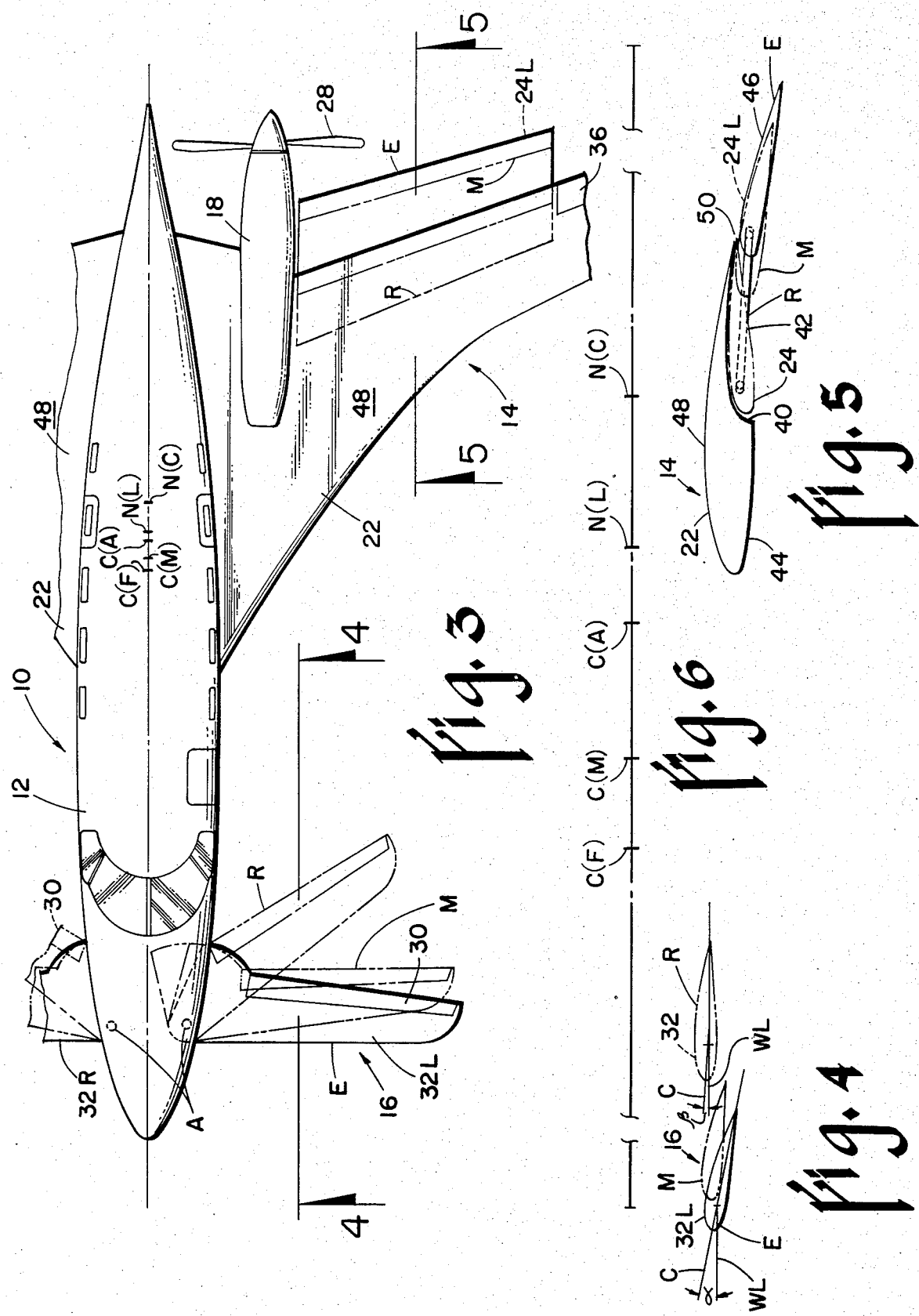

TANDEM OR MULTI-WINGED HIGH PERFORMANCE AIRCRAFT

High-speed aircraft, most of which are designed for supersonic flight, have been known for years that include some type of extendable so-called "canard" wings which upon deployment create a lift force about an aerodynamic center located forwardly of the craft's center of gravity that is capable of offsetting the nose-down pitching moment that results when the primary wing system positioned behind the canard wing system is actuated to shift the neutral point aft. Lockheed Aircraft's U.S. Pat. No. 2,271,226 employs a more or less fixed canard wing system having high-lift elevators or flaps capable of counteracting the diving moment brought about through actuation of similar high-lift elements associated with the main wing that become effective when actuated to shift the aft or main wings center of pressure rearward. Creasey et al U.S. Pat. No. 2,982,496 uses a fixed canard wing in association with a main wing having jettisonable wing extensions that double in function as fuel tanks. Still other essentially fixed tandem-winged aircraft using coordinated flaps on both the fore and aft wings are known in addition to the aforementioned Lockheed patent, one being Blackburn Aircraft's U.S. Pat. No. 2,470,602. Applicant's own "VariEze" and "Long-EZ" home built planes are equipped with canards, several such planes having been pictured and described in the May 1983 issue of Technology Illustrated. Lockheed U.S. Pat. No. 2,511,504 employs a canard wing tiltable about its "spanwise" axis and it is probably this patent that is referred to in Lockheed U.S. Pat. No. 2,271,226. Howard U.S. Pat. No. 2,747,816 shows canard wings that are not only tiltable about their spanwise axes but independently so while encompassing both dihedral and catahedral versions.

Instead of tilting or equipping the canard wing with flaps, probably the most common alternative approach is to move the canard between a fully-deployed position effective to increase lift forward of the center of gravity and a stowed condition having essentially no influence on the flight characteristics. Examples of such canards are found in U.S. Pat. Nos. 2,601,962; 3,642,234; and, 2,924,400. In the latter patent as well as U.S. Pat. No. 3,955,780 directed to a heavier-than-air hovercraft, both wing systems are retractable. Aircraft having only one wing with extendable portions are also known in the prior art such as those forming the subject matter of U.S. Pat. Nos. 2,858,091 and 4,181,277; however, they have no secondary wing system or canard.

The Messerschmitt U.S. Pat. No. 3,883,094 does not stow the canard wing inside or beneath the fuselage, but instead, folds it down into a more or less vertical attitude. McDonnell Douglas in their U.S. Pat. No. 3,680,816 also shows the forward wing folding down while the aft wing sweeps backward. Calderon U.S. Pat. No. 3,218,005 describes several variable lift designs, some with sweepable canards and main wing extensions, another that rotates about a vertical axis and even one with stacked extensions depending from a main delta wing that sweep back into a stowed condition.

Of the several prior art patents known to applicant, probably the majority do not completely stow the canard but instead leave it partially deployed as a continuation of the main or primary wing when operating in the high speed or cruise mode. Among such patented configurations are U.S. Pat. Nos. 3,104,082; 3,489,375; 3,738,595; 3,926,389; and 4,093,156. In each of the latter patents, the canard wing sweeps rearward and remains partially extended as an integral part of a delta wing.

While the prior art aircraft exemplified by the above patents, published articles and the like all recognize the ability of the canard wing system to enhance the low speed performance of aircraft for take-off and landing they, evidently, have failed to appreciate its significance insofar as refining the performance and stability characteristics of the craft in its many other flight regimes. In other words, applicant has now found in accordance with the teaching of the instant invention that by leaving the secondary or canard wing system at least partially, and always significantly, deployed in all flight modes such that it has a marked influence on the flight characteristics of the craft while, at the same time, coordinating its effect with that of lift-increasing flaps operatively associated with the main or primary wing system, greatly improved overall performance and stability become possible. It is not enough, therefore, to extend or otherwise deploy the secondary wing system and rely upon it solely to enhance the performance of the craft in the high angle of attack flight mode. To do so robs the system of potential as yet unrealized in terms of stable, safe and reliable performance.

Applicant, among others, has long recognized that the tandem or multi-winged aircraft possesses certain inherent advantages over the more conventional main wing forward, tail-aft design, such as, for example, the ability to:

(1) Introduce stall progression patterns that provide defined angle of attack limits whereby the aircraft cannot be forced to exceed an angle of attack which results in such unsafe flying qualities as stall departure or spin entry throughout the normal c.g. range.

(2) Reduce induced drag by having the primary wing system take advantage of operating in the upwash flow field that is created outboard of the tips of the secondary wing system located forwardly and inboard thereof.

(3) Provide an overall reduction in the structural weight of the fuselage by reason of the more uniform load distribution attainable and to the lower shear and moment intensities.

(4) Increase the usable cabin volume for a given size fuselage due to smaller aft section needed to carry the empennage group.

(5) Distribute the load among several lifting surfaces thereby effecting a reduction in horizontal flying surface structural weight.

(6) Achieve a greater stick-free stability than the stick-fixed stability of the aforementioned single-wing tail-aft configurations.

(7) Separate the primary and secondary wing systems and load the latter higher than the former thus improving the ride qualities under turbulent conditions while, at the same time, lessening the structural requirements necessary to accommodate larger than average loads.

(8) Effect a reduction in parasitic drag by not having to rely upon the conventional vertical tail for directional stability while using the so-called "Whitcomb" winglet systems for this purpose as well as that of reducing induced drag.

(9) Reduce wing to fuselage interference drag by making it possible to mount the primary wing system at near mid-height on the cabin thus eliminating the need for high-drag fillets and fairings needed in conventional aircraft where the wing is high or low on the fuselage.

Despite these advantages, it has not been possible to realize them in the design of modern complex high performance aircraft. For instance, if one were to equip one of the more common tandem-winged planes such as the Saab Viggen, V-70, Defiant, Quickie, VariViggen or even applicant's own Long-EZ with a set of high-lift flaps on its rear or primary wing system, the neutral point of the craft would move aft and the pitching moment would decrease beyond the ability of the secondary or forward wing system to compensate for it. In other words, to trim the aircraft to the angle of attack needed to achieve high lift, the secondary or canard wing system lacked the ability to provide same.

It has now been found in accordance with the teaching of the instant invention that these and other desirable performance characteristics of tandem or multi-winged high performance aircraft can, in fact, be realized, not only in the high lift landing and take-off modes, but throughout the flight regime by the simple, yet unobvious expedient of sweeping the secondary wings fore and aft while leaving them deployed and effective at all times simultaneously and in carefully coordinated fashion with area-increasing flaps carried by and movable relative to the primary wing system. When, and only when this coordinated movement is carried out through the entire range of flight modes does it become possible to essentially maintain the necessary relationship between the aircraft's center of gravity and neutral point required for stable flight.

It is, therefore, the principal object of the present invention to provide a novel and improved high performance aircraft.

A second objective is the provision of a heavier-than-air powered aircraft having tandem-wing systems equipped with movable surfaces interacting and coacting to maintain stable flight in both a high-lift landing and take-off mode as well as a high speed cruise mode.

Another object is to provide an aircraft of the character described which is more stable and freer of unsafe flying qualities than conventional single-winged designs with the tail located aft of the wing.

Still another objective of the within described invention is to provide an aircraft wherein the tandem-wing configuration results in a significant reduction in induced drag.

An additional objective of the invention herein disclosed and claimed is that of providing an aircraft with a larger allowable c.g. range.

Further objects are to provide an aircraft with a larger useable cabin volume when compared with tail-aft designs, a reduction in the fuselage structural weight and horizontal flying surface structural weight, improved stability and overall performance and ride qualities.

Other objects will be in part apparent and in part pointed out specifically hereinafter in connection with the description of the drawings that follows, and in which:

FIG. 1 is a schematic representative of one type of control system that can be used to effect simultaneous coordinated actuation of the movable lift surfaces associated with the primary and secondary wing systems;

FIG. 2 is a front elevation showing the elements of the secondary wing system in their fully-extended (full line) and swept (phantom line) positions;

FIG. 3 is a top plan view to a scale larger than FIG. 2 and with portions broken away to conserve space showing the movable lifting surfaces of the primary and secondary wing systems in various coordinated operative positions;

FIG. 4 is a vertical section taken along line 4—4 of FIG. 3 showing the elements of the secondary wing system deployed in the fully-extended, fully-retracted and partially-retracted operative positions;

FIG. 5 is a vertical section taken along line 5—5 of FIG. 3 showing the area-increasing elements of the primary wing system in the fully-retracted, partially-extended and fully-extended positions corresponding to the aforementioned three positions of the secondary wing system shown in FIG. 4;

FIG. 6 is a diagram to a greatly enlarged scale showing the same representative change in neutral point shift in association with a range of allowable c.g.'s that can be seen to a reduced scale in FIG. 3; and, FIG. 7 is a schematic detailing the control system of FIG. 1 for coordinating movement of the movable elements of the primary and secondary wing systems.

Figure 7:
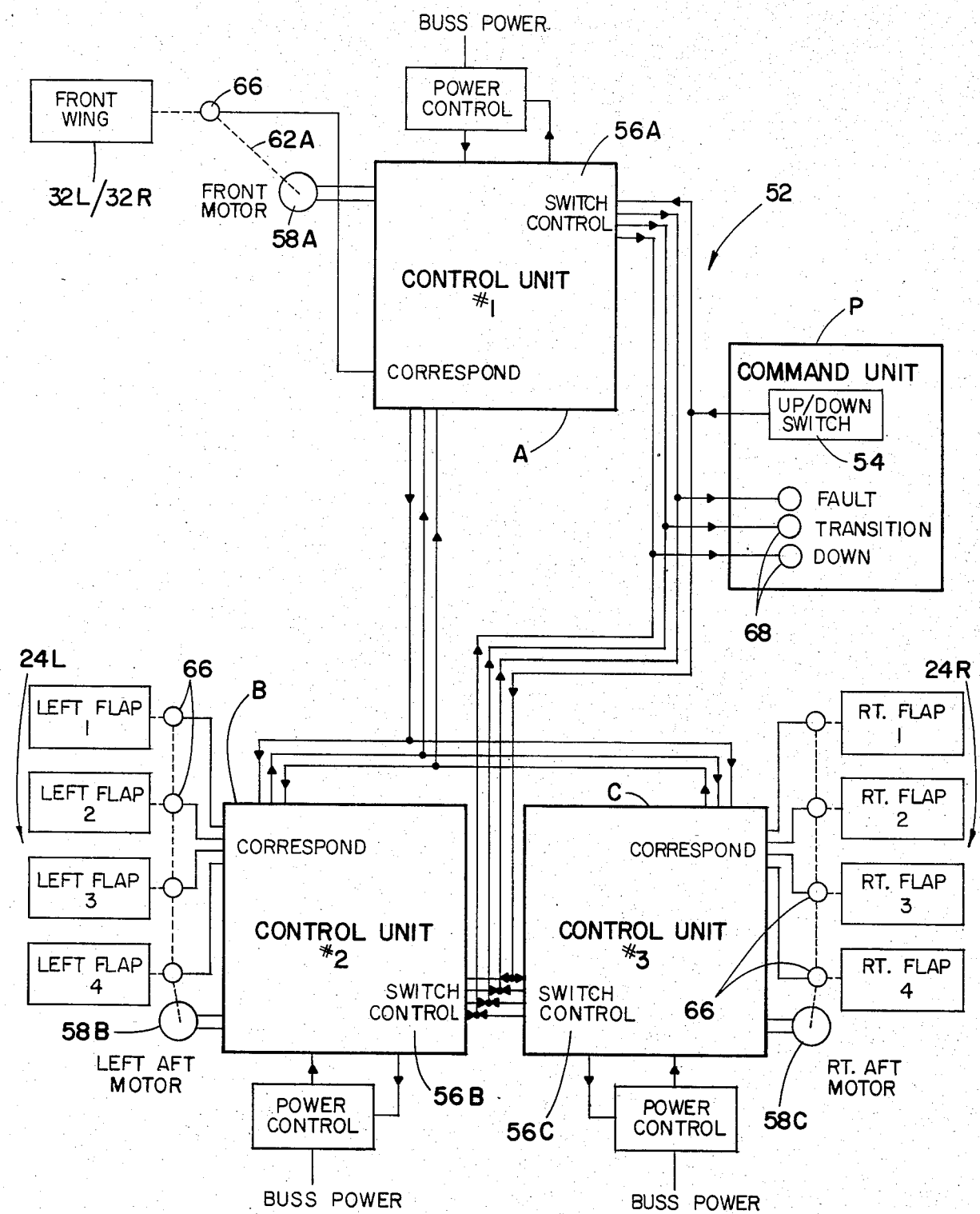

Referring next to the drawings for a detailed description of the present invention and, initially, to FIGS. 1, 2 and 3 for this purpose, reference numeral 10 has been selected to identify the aircraft broadly while numeral 12 connotes its fuselage. Numerals 14 and 16, on the other hand, have been employed to broadly identify primary and secondary wing systems, respectively, both of which will be described in greater detail presently. Numeral 18 identifies twin "pusher-type" engines projecting aft of the primary wing system to which they are attached on opposite sides of the fuselage. In the particular form shown, the conventional empennage group has been eliminated in favor of a pair of so-called "Whitcomb-type" winglets 20 located at the tips of the fixed wing members 22 that make up the primary wing system 14 along with extendable area-increasing elements 24. Winglets 20 extend vertically and provide directional stability that is customarily a function of a vertical stabilizer located amidships on the aft end of the fuselage as a part of the empennage group. A vertical fin 26 is provided amidships, however but, as shown in FIG. 2, it projects vertically downward, not up. This fin is multi-functional in that it contributes some to the aerodynamic stability of the aircraft while, at the same time, acting as a skid to prevent the propellers 28 from hitting the ground during an inadvertent overrotation. These features, those of the winglets 20, the elevators 30 (FIG. 3) for pitch control located along the trailing edge of the movable wing elements 32 that cooperate to make up the secondary wing system 16, nor the flap elements 36 on the trailing edge of the primary wing elements 22, form any part of the present invention since they and their functions are conventional and well known. For instance, flaps 36 can, within the skill of the art, be designed to function as ailerons for roll control or, alternatively, as elevons for both roll and pitch control. Thus, while the present invention has been illustrated and will be described in connection with a tandem-winged, twin-engined, propeller-driven pusher-type subsonic aircraft, the same principles could be applied to jet engine-powered aircraft with but a single engine or more than two. Similarly, while the primary lifting surface 14 consists of a single fixed wing 22 and its associated control flaps, such a surface could be divided up into two, and perhaps even more, symmetrically positioned lifting surfaces by an accomplished aircraft designer exercising no more than ordinary skill. The novelty, therefore, resides not in the design, arrangement and control of the conventional aerodynamic surfaces but rather in the coordinated simultaneous movement of the secondary wing system 16 with the area-increasing extendable elements 24 of the primary wing system in a manner which will now be set forth in detail with specific reference, first of all, to FIGS. 2, 3, 4 and 5.

FIG. 3 most clearly reveals the fact that the elements 32 of the secondary wing system 16 are pivoted at their inboard end for pivotal movement about more or less vertically-disposed axes of pivotal movement A located within the confines of the fuselage between the extremes of a forwardly-extended position E shown in full lines and a retracted position R which is the rearmost one of the two shown in phantom lines. These same two extreme positions are similarly identified in FIGS. 2 and 4. With continued reference to FIG. 3, it can be seen that with elements 32 of the secondary wing system fully extended into a forward position E, their leading edges lie essentially at right angles to the longitudinal centerline of the aircraft thus defining a so-called "sweep angle" of 90°. The secondary wing elements can be moved further forward into the range of sweep angles of, say 120° before the loss of effective lift area becomes so great that their "high-lift" function is no longer realized.

In the retracted or fully-swept position of the secondary wing system 16, both elements 32 thereof swing aft to decrease their sweep angles about their respective pivots A to a position where they bear the same acute angular relationship to the centerline of the fuselage. When designed for propeller-driven subsonic flight with twin-pusher engines as shown, the wing elements 32 in retracted position R have their leading edges swept aft to a sweep angle of some 53°. A maximum of about 50° is probably all that can produce the required lift needed for subsonic flight regimes. On the other hand, if one were to design the craft to cruise in the supersonic range the sweep angle could and would be significantly less than 50°. Regardless of whether the craft is designed to operate subsonically or cruise in the supersonic range, the significant thing is that the secondary wing system remains deployed and fully effective to provide lift in all flight regimes, not just the low speed landing and take-off mode.

Now, two other features of the secondary wing system are significant but not revealed in FIG. 3. In FIG. 2, it can be seen that the secondary wing system not only has dihedral in both the fully-extended position E and the retracted position R as well as all intermediate positions but, in addition, the dihedral angle increases very slightly (less than a degree) as the elements 32 of the secondary wing system sweep aft, the increase having been overstated for purposes of illustration. Thus, even though the axes of pivotal movement A are essentially vertical and parallel to one another, the location at which the wing elements attach thereto and their incidence angle is selected such that the foregoing small increase in dihedral takes place as the secondary wing elements sweep aft.

The second of the two features is revealed to some extent in both FIGS. 2 and 4 but only clearly in the latter figure where it can be seen that the incidence angle decreases as the secondary wing elements move from position E back to position R. No attempt has been made to illustrate the actual decrease in incidence angle which at a point approximately half way out on the wing elements 32 decreases from a maximum at position E of slightly over 5° ($\alpha$) to one at position R of just over 3° ($\beta$). Obviously, a change of but 2° is difficult to show in a meaningful way at the scale of FIG. 4, therefore, the change in incidence angle has been greatly exaggerated for illustrative purposes. Angles $\alpha$ and $\beta$ have been shown in FIG. 4 measured between a chord line C and a common reference line WL, the chord line C being located approximately at the section line 4—4 of FIG. 3.

FIGS. 3 and 4 also show one of many intermediate positions M occupied by the secondary wing elements 32 as they sweep fore and aft between extreme positions E and R. An intermediate position M is shown by dot-dashed lines in FIGS. 3 and 5 to indicate that for each of the partially-extended positions of the secondary wing system, the area-increasing elements 24 of the primary wing system have a deployed position corresponding thereto. In other words, it is only when the elements of the secondary wing system are fully extended (position E) that the area-increasing elements 24 are also fully extended (full line position of FIGS. 3, 4 and 5.) Thus, whenever the system 32/24 described above is in transition, each element has a coordinated position relative to the other such that the aircraft maintains essentially a trimmed condition. If it were not so and the secondary wing elements were moved, for example, from retracted position R into extended position E before the area extending elements 24 were deployed, an interim condition of instability would result, and vice versa.

Turning next to FIGS. 3 and 5, it can be seen that the area-increasing elements 24, wing flaps on the trailing edge of the primary wing members 22 in the particular form shown, move from a fully-retracted position R stowed in a shaped recess 40 (FIG. 5) on the underside of the latter into a deployed position M or E projecting aft of its trailing edge. In the stowed position R, the underside 42 of the flaps define a continuation of the convex surface 44 on the corresponding surface 44 of the primary wing as seen in FIG. 5. On the other hand, when deployed, the upper surface 46 of the flaps 24 define continuations of the primary wings shaped upper surface 48 even though a gap 50 is left between the trailing edge of the primary wing elements and the leading edge of the flaps.

Referring again to FIG. 3, the aircraft 10 has both a center of gravity (c.g.) and a neutral point (N.P.), the latter having been fully described in Column 6 of U.S. Pat. No. 3,680,816 as ". . . the distance from the leading edge of the mean aerodynamic chord on the [primary] wing to the point at which the resultant stabilizing force produced by perturbations in flight attitude is felt, . . . " where the mean aerodynamic chord of the primary wing system is defined as ". . . the wing area divided by the wing span—". Now, the c.g., of course, shifts fore and aft, from side-to-side and even up and down depending upon the load distribution. FIGS. 3 and 6 show an allowable c.g. range C(F) to C(A) within which stable and controlled flight can be maintained. Any shift in the load or lessening thereof during flight occasioned by fuel use results in some shift in the c.g. The c.g. is also shifted fore and aft to some degree depending upon the position of the movable elements 24 and 32 of the primary and secondary wing systems. As noted in the aforementioned McDonnel Douglas patent, neutral point (N.P.) also shifts as the location of the lift-producing elements is changed. Specifically, with reference to the instant system, area-increasing elements 24 of the primary wing system or the sweep angle of the secondary wing system 16 if actuated independently of one another will bring about a shift in the neutral point. More important, however, is the fact that moving one or the other brings about a change in the spaced relationship under any given set of conditions between the c.g. and N.P. which, if allowed to exceed certain limits, will have an adverse effect upon the stability. In other words, regardless of the position of the c.g. within its predetermined allowable limits, there exists a narrow range of positions of the N.P. relative thereto which will result in stable, controllable trimmed flight.

It is the teaching of the instant invention that this desirable and necessary stable flight performance can, not only be restored, but maintained throughout both the high-lift landing/take-off mode and the high speed cruise mode but during the transition between the two by moving the movable elements 24 and 32 of the primary and secondary wing system, respectively, in simultaneous coordinated fashion as opposed to independent actuation simultaneous or otherwise. In FIGS. 3 and 6, C(F) and C(A) approximate the fore-aft allowable range of c.g. movement while C(M) connotes a representative center of gravity location therebetween. The symbol N(L) on the other hand, represents the approximate location of the neutral point (N.P.) relative to the C(M) that exists during flight in the high-lift mode while N(C) indicates its shift aft in the high speed mode.

In accordance with applicant's teaching, to achieve the foregoing relationship between the center of gravity and neutral point, certain critical parameters must exist with respect to the primary and secondary wing systems. To begin with, both must be aerodynamically capable of generating positive lift. Next, the secondary wing system must be located forwardly of the primary one with the former having an average positive lift per unit area greater than the positive lift per unit area of the latter. For instance, at maximum cruise speed, assuming an average cruise gross weight of 11,000 lbs., the average positive lift per unit area of the secondary wing system illustrated is 45.5 lb/ft$^2$ while that of the primary wing system is only 30.3 lb/ft$^2$. By effectuating this lift relationship while positioning the area-increasing flaps of the primary wing system aft of the center of gravity, it becomes possible to sweep the secondary wing elements forwardly into a position corresponding to each deployed position of the flaps which essentially negates any shift in the neutral point relative to the center of gravity of a magnitude great enough to produce unstable or uncontrollable flight. Simply stated, the coordinated simultaneous movement of the secondary wing elements and movable flaps of the primary wing elements maintains, as opposed to providing a way of restoring, the condition of stable flight represented by a proper spaced relationship between the neutral point and center of gravity.

More specifically, with reference to FIGS. 3 and 6, if, for example, the fuselage is, say, 45½ feet in length or thereabouts, the maximum aft shift of the c.g. will lie at about 320 inches from the nose. This point represents a pilot, no cargo and just enough fuel to get airborne. As the plane is loaded more heavily, the c.g. will shift forwardly a maximum safe limit of some 15 inches to 305 inches C(F) behind the nose. This would take place only under conditions of near maximum loading. While the aircraft would fly when loaded to shift the c.g. even farther forward, its controllability would be less than satisfactory. When carrying a load consisting of the pilot, a full passenger compartment containing eight passengers, a full load of fuel and an average cargo load, the center of gravity C(M) will be at approximately 311 inches or some 2/5ths of the way between the C(F) and C(A).

The neutral point in the cruise mode N(C) on the other hand lies at about 335 inches aft of the nose and it shifts forwardly some ten inches to a point 325 inches aft when the secondary wing elements 32 are deployed in the high-lift mode where they are fully extended. Thus, when taking off with a full load of fuel, passengers, some cargo and a pilot such that C(M) is at about 311 inches aft of the nose, the neutral point N(L) will be some 14 inches behind the latter at about 325 inches. In cruise mode, on the other hand, with the area-increasing flaps 24 stowed beneath the primary wing elements, the neutral point will shift aft another ten inches to 335 inches aft of the nose. All the time the aircraft is flying, however, it is consuming fuel thereby lessening the load and moving the center of gravity aft such that the approximately ten inch difference in spacing between the center of gravity and neutral point in the high-lift and cruise modes becomes more like 6 inches which is well within acceptable trimmed and stable flight limits. More important than this almost negligible difference is the fact that by extending the secondary wing elements while, at the same time, extending the area-increasing elements 24, the neutral point always remains at least a few inches aft of the rearmost possible center of gravity. In other words, were it not for this coordinated simultaneous deployment of these lifting surfaces into their fully-extended positions, the neutral point in the high-lift mode N(L) would, or at least could, shift forwardly of the center of gravity thus producing an unstable and unsafe flight condition.

Next, with brief reference to FIGS. 1 and 6, a representative electromechanical control system has been shown by means of which the coordinated movement of the secondary wing system elements 32R and L and those of the primary wing system can be effectuated to maintain a reasonably close spatial relation between the center of gravity and neutral point in both the high-lift and high-speed flight modes. Control system 52 comprises a command unit P located in the pilot compartment which includes a master "up/down switch" 54 that controls slave units A, B, and C, each of which includes separate remote switch controls 56A, 56B and 56C. These switch controls, in turn, control, respectively, the forward and reverse movements of front motor 58A, left aft motor 58B and right aft motor 58C. Each of the three motors comprises a standard reversible electric motor coupled with a gear box of conventional design, motor 58A being connected to the secondary wing elements in a manner to extend and retract same while motors 58B and 58C are connected to do likewise with respect to the right and left area-increasing flap subassemblies 24L and 24R, respectively. These motors are operative upon actuation to each run in a direction such that the area-increasing flaps are all being extended simultaneously with movement of the secondary wing system elements into forwardly-extended position and vice versa. As these movable wing elements reach the end of their travel, limit switches (not shown) stop the motors and reverse them preparatory to actuation in the opposite direction. Means (not shown) are customarily provided that synchronize movement of all the aforementioned wing elements. In other words, it is important for stable safe flight that these elements move together, therefore, if one motor gets ahead or behind the others, means within the skill of the art are customarily provided for bringing the systems back into synchronism.

These motors are mechanically connected to servomotors 60 which comprise gear boxes operative to turn a screw connected to the wing elements. Servomotor 60A is connected as shown to motor 58A while motors 58B and 58C are similarly connected to servomotors 60B and 60C. While a single servomotor and associated cross linkage 62A cooperate to effect simultaneous actuation of both the left and right secondary wing elements 32L and 32R, servomotors 60B and 60C are connected in series to slave servomotors 60S and 60T by means of flexible shafts 64S and 64T. The size and width of the flap subassemblies 24L and 24R each as shown including four subflaps, are such as to require a total of three servomotors each in order to achieve a smooth dependable transition between stowed and deployed positions, nevertheless, since all the subflaps are mechanically interconnected, they move as a unit. Remote detectors 66 sense the position of various elements of the control system and relay this information back to a display 68 in the command unit.

The details of the above described control unit are unimportant and are well within the skill of an ordinary artisan to design. Whether it be the electromechanical system shown, a hydraulic one or even a purely mechanical apparatus operated manually, it can be seen that such a system or the equivalent thereof provides a way of coordinating the movements of the movable elements of the primary and secondary wing systems. Specifically, as the area-increasing flaps 24L and 24R are simultaneously deployed from their stowed or fully-retracted position R of FIGS. 3 and 5 into their extended positions E, the elements 32L and 32R of the secondary wing system are moving to their forwardly-extended high-lift positions E in FIGS. 3 and 4 from their swept high-speed positions R, all such movement taking place in coordinated fashion so as to effectively maintain the desired spatial relationship between the center of gravity and the neutral point that produces stable, safe flight.

What is claimed is:

1. A tandem or multi-winged aircraft comprising: a fuselage; primary and secondary wing systems attached to said fuselage for supplying positive lift thereto; propulsion means for generating a forward thrust, said fuselage, wing systems and propulsion means cooperating to define a center of gravity and a neutral point having a spaced relationship to one another effective to maintain stable flight, said secondary wing system having an average positive lift per unit area greater than the average positive lift per unit area of said primary wing system, said secondary wing system being mounted forwardly of said primary wing system, said secondary wing system including a pair of wing elements pivotally movable fore and aft relative to said fuselage between a retracted position swept aft to define a sweep angle bearing an acute angular relationship to the latter and an extended forwardly swept position in which said sweep angle is substantially increased, said primary wing system including at least one pair of fixed primary wing elements, said secondary wing elements and said one pair of primary wing elements both having a positive net lift; area-increasing means operatively associated with said one pair of primary wing elements located aft of said center of gravity, said area-increasing means being effective upon independent actuation to vary said spaced relationship between said center of gravity and neutral point; and control means operatively interconnecting said area-increasing means in all operative positions of the latter so as to simultaneously vary the sweep angel of said secondary wing elements and coordinate movement thereof with that of said area-increasing means to the extent required to at least substantially maintain said predetermined spaced relationship.

2. The aircraft in accordance with claim 1 wherein: the control means is operative upon actuation in one mode to sweep the secondary wing elements aft and retract the area-increasing means into a stowed position to define a high-speed cruise regime, and in a second mode to extend said secondary wing elements forwardly while extending said area-increasing means aft into a deployed position relative to said primary wing elements thus defining a high-lift regime more suitable for landing and take-off.

3. The aircraft in accordance with claim 1 wherein: the secondary wing elements and the area-increasing means cooperate with one another in all positions when in flight to maintain the neutral point aft of the center of gravity.

4. The aircraft in accordance with claim 1 wherein: the secondary wing elements sweep fore and aft through an angle of approximately 40°.

5. The aircraft in accordance with claim 1 wherein: the secondary wing elements are mounted for pivotal movement about separate substantially vertical axes lying in transversely-spaced parallel relation to one another.

6. The aircraft in accordance with claim 1 wherein: the secondary wing elements each include a leading edge, the fuselage has a longitudinal centerline, and said leading edge lies essentially perpendicular to said centerline to define a sweep angle of approximately 90° when said elements are fully extended.

7. The aircraft in accordance with claim 1 wherein: the secondary wing elements each includes a leading edge, the fuselage has a longitudinal centerline, and said leading edge in the fully-retracted position of said elements has a sweep angle of approximately 53°.

8. The aircraft in accordance with claim 1 wherein: said secondary wing elements have dihedral in all positions thereof.

9. The aircraft in accordance with claim 1 wherein: said primary wing elements include recesses in the underside thereof shaped to accommodate said area-increasing means, said area-increasing means comprise rearwardly-extendable flaps movable from a stowed position within said recesses to a deployed position defining extensions of the associated primary wing element effective to shift the neutral point aft.

10. The aircraft in accordance with claim 1 wherein: the incidence angle of the secondary wing elements changes as the sweep angle thereof changes.

11. The aircraft in accordance with claim 4 wherein: the secondary wing elements sweep through an angle of between approximately 90° and 53°.

12. The aircraft in accordance with claim 9 wherein: the primary wing elements have leading and trailing edges, the recesses lie adjacent the trailing edges, the undersides of said wing elements between said recesses and the leading edges thereof are contoured, and wherein said area increasing means in stowed position have the undersides thereof shaped to define continuations of said contoured primary wing element undersurfaces.

13. The aircraft in accordance with claim 9 wherein: the top surfaces of the primary wing elements are contoured, and the top surfaces of said area increasing means are shaped to define continuations of said contoured upper primary wing surfaces when deployed in extended operative position.

14. The aircraft in accordance with claim 9 wherein: the primary wing elements have contoured upper surfaces and undersurfaces adjacent the recesses therein, and said area increasing means have the undersurfaces thereof shaped to cooperate in stowed position with both the contoured undersurfaces and top surfaces of said primary wing elements to define an airfoil effective to generate positive lift.

15. The aircraft in accordance with claim 10 wherein: the incidence angle increases approximately 3°.

16. A tandem-winged aircraft comprising: a fuselage; primary and secondary wing systems attached to said fuselage for supplying positive lift thereto, said secondary wing system having an average positive lift per unit area greater than the average positive lift per unit area of said primary wing system, said secondary wing system being mounted forwardly of said primary wing system and including a pair of wing elements devoid of area-increasing flaps pivotally movable fore and aft relative to said fuselage between a retracted position swept aft to define a sweep angle bearing an acute angular relationship to the latter and an extended forwardly swept position in which said sweep angle is substantially increased, and said primary wing system including a pair of fixed wing elements having leading and trailing edges; area-increasing flap means depending from the trailing edge of each of the fixed wing elements of the primary wing system for movement relative thereto between a retracted position and an extended position, said area-increasing flap means being so designed and located as to produce a pitching moment upon extension thereof, and said secondary wing system elements having an extended position effective to counteract said pitching moment generated in each extended position of said area-increasing flap means; and, control means operatively interconnecting the area-increasing flap means and secondary wing system elements in all positions of the latter effective to simultaneously vary the sweep angle of said secondary wing system elements and coordinate movement thereof with that of said area-increasing flap means to the extent required to maintain a stable flight regime.

17. The aircraft in accordance with claim 16 wherein: the incidence angle of the secondary wing system elements changes as the sweep angle thereof changes.

18. The aircraft in accordance with claim 16 wherein: the control means is operative upon actuation in one mode to sweep the secondary wing system elements aft and retract the area-increasing flap means into a stowed position to define a high-speed cruise regime, and in a second mode to extend said secondary wing system elements forwardly while extending said area-increasing flap means aft into a deployed position relative to said primary wing elements thus defining a high-lift regime more suitable for landing and take-off.

19. The aircraft in accordance with claim 16 wherein: the secondary wing system elements have dihedral in all positions thereof.

20. The aircraft is accordance with claim 16 wherein: said primary wing elements include recesses in the underside thereof shaped to accommodate said area-increasing flap means, and wherein said area-increasing flap means when in retracted position are stowed within said recesses.

21. The aircraft in accordance with claim 17 wherein: the incidence angle increases approximately 3°.

22. The aircraft in accordance with claim 20 wherein: the recesses lie adjacent the trailing edges of the primary wing elements, the undersides of said primary wing elements between said recesses and the leading edges thereof are contoured, and wherein said area-increasing flap means in stowed position have the undersides thereof shaped to define continuations of said contoured primary wing element undersurfaces.

23. The aircraft in accordance with claim 20 wherein: the top surfaces of said primary wing elements are contoured, and the top surfaces of said area-increasing flap means are shaped to define continuations of said contoured upper primary wing element surfaces when deployed in extended position.

* * * * *